United States Patent
Hirano (10) Patent No.: US 7,460,274 B2
(45) Date of Patent: Dec. 2, 2008

(54) CONTROLLING APPARATUS FOR OUTPUTTING PROCESSED IMAGE DATA

(75) Inventor: Sachiko Hirano, Hino (JP)

(73) Assignee: Konica Minolta Medical & Graphic, Inc. (JP)

( * ) Notice: Subject to any disclaimer, the term of this patent is extended or adjusted under 35 U.S.C. 154(b) by 712 days.

(21) Appl. No.: 11/156,891

(22) Filed: Jun. 20, 2005

(65) Prior Publication Data
US 2005/0286066 A1 Dec. 29, 2005

(30) Foreign Application Priority Data
Jun. 29, 2004 (JP) ............................. 2004-191019

(51) Int. Cl.
G06K 15/00 (2006.01)
H04N 1/40 (2006.01)
G06F 15/00 (2006.01)
G06K 1/00 (2006.01)

(52) U.S. Cl. ........................................ 358/2.1; 358/1.9

(58) Field of Classification Search .................. 358/1.9, 358/2.1, 3.01, 3.02, 3.06, 3.1, 3.11, 3.26, 358/1.18
See application file for complete search history.

(56) References Cited

U.S. PATENT DOCUMENTS 6,044,204 A * 3/2000 Takamatsu et al. ........... 358/1.9
6,798,541 B2 * 9/2004 Curry ......................... 358/2.99

FOREIGN PATENT DOCUMENTS

JP 61-189774 8/1986
JP 2000-350024 12/2000

* cited by examiner

Primary Examiner—Douglas Q Tran
(74) Attorney, Agent, or Firm—Cantor Colburn LLP (57) ABSTRACT

There is described an image outputting system including an image outputting apparatus and a controlling apparatus to control the image outputting apparatus to form the image on a recording medium. The controlling apparatus includes: an extracting section to extract an edge, defined as a contour of an intermediate tone object, based on the image data; a correcting section to correct a density value located in a vicinity of the edge, to make the density value high and to generate corrected image data; and a halftone-dot image data generating section to convert the corrected image data to halftone-dot image-data, which represent a halftone-dot image constituted by halftone-dots, each of which is formed by a plurality of pixels based on the corrected image data. The controlling apparatus controls the image outputting apparatus so as to output the halftone-dot image formed on the recording medium, based on the halftone-dot image data.

20 Claims, 8 Drawing Sheets

COMPARISON WITH HALFTONE DOT REFERENCE DATA

LEVEL 1

| 83 | 51 | 35 | 67 | 89 |
|---|---|---|---|---|
| 81 | 19 | 3 | 25 | 57 |
| 49 | 17 | 1 | 9 | 41 |
| 65 | 33 | 11 | 27 | 73 |
| 97 | 75 | 43 | 59 | 91 |

LEVEL 2

| 85 | 53 | 37 | 69 | 92 |
|---|---|---|---|---|
| 84 | 21 | 5 | 28 | 60 |
| 52 | 20 | 4 | 12 | 40 |
| 68 | 36 | 13 | 29 | 76 |
| 99 | 77 | 45 | 61 | 93 |

LEVEL 3

| 88 | 56 | 40 | 72 | 95 |
|---|---|---|---|---|
| 87 | 24 | 8 | 31 | 63 |
| 55 | 23 | 7 | 15 | 47 |
| 71 | 39 | 16 | 32 | 79 |
| 100 | 80 | 48 | 64 | 96 |

FIG. 9 (b)

RASTER DATA

| 50 | 50 | 50 | 50 | 50 |
|---|---|---|---|---|
| 50 | 50 | 50 | 50 | 50 |
| 50 | 50 | 50 | 50 | 50 |
| 50 | 50 | 50 | 50 | 50 |
| 50 | 50 | 50 | 50 | 50 |

FIG. 9 (d)

HALFTONE DOT IMAGE DATA

| 0 | 0 | 3 | 0 | 0 |
|---|---|---|---|---|
| 0 | 3 | 3 | 3 | 0 |
| 1 | 3 | 3 | 3 | 3 |
| 0 | 3 | 3 | 3 | 0 |
| 0 | 0 | 3 | 0 | 0 |

FIG. 9 (a)

RASTER DATA

FIG. 9 (e)

HALFTONE DOT IMAGE DATA

| HALFTONE % | 0 | 10 | 30 | 50 | 70 | 100 |
|---|---|---|---|---|---|---|
| CORRECTION VALUE | 0 | 5 | 10 | | 5 | 0 |

| 30 | 30 | 30 | 30 | 30 |
|---|---|---|---|---|
| 30 | 30 | 30 | 30 | 30 |
| 30 | 30 | 30 | 30 | 30 |
| 30 | 30 | 30 | 30 | 30 |
| 30 | 30 | 30 | 30 | 30 |

| 0 | 0 | 0 | 0 | 0 |
|---|---|---|---|---|
| 0 | 3 | 3 | 2 | 0 |
| 0 | 3 | 3 | 3 | 0 |
| 0 | 0 | 3 | 2 | 0 |
| 0 | 0 | 0 | 0 | 0 |

| 50 | 50 | 50 | 50 | 50 |
|---|---|---|---|---|
| 50 | 50 | 50 | 50 | 50 |
| 50 | 50 | 50 | 50 | 50 |
| 50 | 50 | 50 | 50 | 50 |
| 50 | 50 | 50 | 50 | 50 |

| 0 | 0 | 3 | 0 | 0 |
|---|---|---|---|---|
| 0 | 3 | 3 | 3 | 0 |
| 1 | 3 | 3 | 3 | 3 |
| 0 | 3 | 3 | 3 | 0 |
| 0 | 0 | 3 | 0 | 0 |

| 70 | 70 | 70 | 70 | 70 |
|---|---|---|---|---|
| 70 | 70 | 70 | 70 | 70 |
| 70 | 70 | 70 | 70 | 70 |
| 70 | 70 | 70 | 70 | 70 |
| 70 | 70 | 70 | 70 | 70 |

| 0 | 3 | 3 | 2 | 0 |
|---|---|---|---|---|
| 0 | 3 | 3 | 3 | 3 |
| 3 | 3 | 3 | 3 | 3 |
| 2 | 3 | 3 | 3 | 0 |
| 0 | 0 | 3 | 3 | 0 |

| 100 | 100 | 100 | 100 | 100 |
|---|---|---|---|---|
| 100 | 100 | 100 | 100 | 100 |
| 100 | 100 | 100 | 100 | 100 |
| 100 | 100 | 100 | 100 | 100 |
| 100 | 100 | 100 | 100 | 100 |

| 3 | 3 | 3 | 3 | 3 |
|---|---|---|---|---|
| 3 | 3 | 3 | 3 | 3 |
| 3 | 3 | 3 | 3 | 3 |
| 3 | 3 | 3 | 3 | 3 |
| 3 | 3 | 3 | 3 | 3 |

RASTER DATA          HALFTONE DOT IMAGE DATA          HALFTONE-DOT SHAPE

FIG. 13

CONTROLLING APPARATUS FOR OUTPUTTING PROCESSED IMAGE DATA

This application is based on Japanese Patent Application NO. 2004-191019 filed on Jun. 29, 2004 in Japanese Patent Office, the entire content of which is hereby incorporated by reference.

BACKGROUND OF THE INVENTION

The present invention relates to an image outputting system, an image outputting method for creating a color proof of a halftone image for checking the final form of the printed matter beforehand or for creating the final product using an electro-photographic image outputting apparatus. The present invention also relates to the image outputting method, a program for executing the foregoing method and a computer-readable information recording medium on which the program is recorded.

In recent years, DTP (Desk Top Publishing) and the like have been becoming more popular, and as a result image editing and page adding operations using a computer are becoming standard, and full digital editing is no longer rare.

In these types of processes, image setter output in which image data which has been subjected to page editing is directly output to film, or CTP (computer to plate) output in which image recording is performed directly on the printing plate and CTC (computer to cylinder) output in which image recording is performed directly on the printing plate which is wound onto the cylinder of the printer are being performed with the object of improving efficiency.

Furthermore, proofs are created and used in 3 main applications in the correction processes in these types of printing processes, and these are (1) error checking at the operation site, or in other words, internal correction; (2) external correction which is submitted for checking of the completed work by the designer or the order holder; (3) print sample that is submitted to the person in charge of printing as a sample of final print material. The final form of the printed material was checked beforehand to determine if there are errors in the document layout, in color, or in text.

In this system, there was the problem that some film output and printing plate output must be performed just for proof checking, and when proofing is done using print proofs and other proof material, film and printing plates are wasted and many unnecessary operations had to be performed.

As a result, in the process of performing full digital image creation and editing using a computer in particular, there is demand for systems which performs direct-color image output called DDCP (Direct Digital Color Proof) or DCP (Digital Color Proof). Prior to recording from the digital image data processed on the computer onto the plate making film using an image setter or the like, or performing final printing operations for creating a direct printing plate using CTP, or performing direct image recording on the printing plate that is wound on the cylinder of the printer using CTC, a color proof which reproduces output showing the digital image that was processed by the computer is created, and the picture pattern, tone and the text and the like were checked.

Another example of a device for creating a color proof is a color proof creation device in which light spots composing plural lights having combinations of different wavelengths such as R, G and B are exposed on a silver salt color light-sensitive material based on halftone dot image data for each of the color separated halftone dot originals, and halftone dot images are reproduced and a color proof is created by performing color development for dots of each of the 3 fundamental colors Y, M and C.

Meanwhile, there is a comprehensive layout (abbreviated and referred to as comp hereinafter), which does not require the image quality of a color proof, but shows overall design and is used for obtaining approval from an advertiser for example. In the past, a color laser printer using an electro-photographic system was used for creating this comp.

However, with the increase in quality of the color laser printer in recent years, high speed and high grade color output has become possible at a low cost and as a result, there is increasing demand for not only comp applications, but also DCCP applications. That is to say there is increasing demand for use of color laser printers in creating color proofs, as well increased demand for the output from the color laser printer to be used as final product.

For the outputted product of a color laser printer, halftone-dot images are formed and output by forming halftone-dots of areas including a plurality of pixels, in order to simultaneously achieve a number of lines and gradation expression close to that of the technology existing heretofore. Also, in the case of a multi-value dot image formed of pixels with multiple values, there are ways to suppress deterioration of image gradation caused by instability in the formation of the intermediate tone pixels due to the process called electro-photography. These include limiting the number of intermediate tone pixels in the area forming one pixel (See Patent Document 1 for example) and changing the number of intermediate tone pixels in the area forming one halftone-dot using density values (See Patent Document 2 for example).

[Patent Document 1]
    Tokkaisho 61-189774 (Japanese Non-Examined Patent Publication)

[Patent Document 2]
    Tokkai 2000-350024 (Japanese Non-Examined Patent Publication)

However, because in general, the resolution is lower in the color laser printer than the conventional printing system such as the offset printer, the outline portion of each object in the image is not necessarily shaped as a complete halftone-dot and in some cases portions may be missing. In addition, in the case of the multi-value halftone-dot image in which the pixel is formed with multiple values, the halftone-dot including an intermediate gradation pixel with a portion missing is extremely weak due to instability in the formation of the intermediate gradation pixels. Consequently, smoothness of the outline of the intermediate tone objects of intermediate gradation density in particular is lost and this gives the impression that the outline which was originally linear has a saw tooth shape.

This type of deterioration in image quality did not cause problems for comp application, but it poses a problem with regards to color proof application and use as final product.

SUMMARY OF THE INVENTION

To overcome the abovementioned drawbacks in conventional image outputting methods and systems, an embodiment of the present invention may provide an image outputting system, an image output method, a program for executing the foregoing method and a computer-readable information recording medium on which the program is recorded, wherein deterioration of the outline of intermediate tone object that forms the image is suppressed at the time of output of the halftone image using an electro-photographic image outputting apparatus, thus making improvement in image quality possible.

Accordingly, to overcome the cited shortcomings, the abovementioned embodiment of the present invention may be attained by image outputting systems and methods described as follow.

(1) A system for outputting an image formed on a recording medium, based on image data transmitted through a network, the system comprising: an image outputting apparatus to output the image formed on the recording medium; and a controlling apparatus that receives the image data transmitted through the network to output processed-image data generated from the image data, and controls the image outputting apparatus so as to form the image on the recording medium, based on the processed-image data; wherein the controlling apparatus includes: an extracting section to extract an edge, defined as a contour of an intermediate tone object, based on depicting information represented by the image data; a correcting section to correct a density value, residing within the intermediate tone object and located in a vicinity of the edge, so as to make the density value high and to generate corrected image data; and a halftone-dot image data generating section to convert the corrected image data to halftone-dot image data, which represent a halftone-dot image constituted by halftone-dots, each of which is formed by a plurality of pixels based on the corrected image data; and wherein the controlling apparatus controls the image outputting apparatus so as to output the halftone-dot image formed on the recording medium, based on the halftone-dot image data, serving as the processed-image data.

(2) The system of item 1, further comprising: a correction value table to store correction values determined corresponding to density values; wherein the correcting section corrects the density value, based on the correction values stored in the correction value table.

(3) The system of item 2, wherein the correction values are determined such values that do not make corrected density values represent a solid area.

(4) The system of item 1, wherein a number of screen lines, which are included in the halftone-dot image outputted by the image outputting apparatus, based on the halftone-dot image data, is equal to or greater than a predetermined number of screen lines.

(5) The system of item 4, wherein the predetermined number of screen lines is 140 lpi.

(6) A system for outputting an image formed on a recording medium, based on image data transmitted through a network, the system comprising: an image outputting apparatus to output the image formed on the recording medium; and a controlling apparatus that receives the image data transmitted through the network to output processed-image data generated from the image data, and controls the image outputting apparatus so as to form the image on the recording medium, based on the processed-image data; wherein the controlling apparatus includes: an extracting section to extract an edge, defined as a contour of an intermediate tone object, based on depicting information represented by the image data; an edge-side density value determining section to determine a first density value and a second density value being higher than the first density, at a first side area and a second side area, respectively, while putting the edge between the first side area and the second side area as a boundary of different tone areas; a correcting section to correct a density value, residing within the second side area and located in a vicinity of the edge, so as to make the density value high, when both the first density value and the second density value indicate halftone areas or when the second density value indicates a halftone area and the first density value indicates a blank tone area, while, to correct a density value, residing within the first side area and located in a vicinity of the edge, so as to make the density value high, when the first density value indicates a halftone area and the second density value indicates a saturated tone area, in order to generate corrected image data; and a halftone-dot image data generating section to convert the corrected image data to halftone-dot image data, which represent a halftone-dot image constituted by halftone-dots, each of which is formed by a plurality of pixels based on the corrected image data; and wherein the controlling apparatus controls the image outputting apparatus so as to output the halftone-dot image formed on the recording medium, based on the halftone-dot image data, serving as the processed-image data.

(7) The system of item 6, further comprising: a correction value table to store correction values determined corresponding to density values; wherein the correcting section corrects the density value, based on the correction values stored in the correction value table.

(8) The system of item 7, wherein the correction values are determined such values that do not make corrected density values represent a solid area.

(9) The system of item 6, wherein a number of screen lines, which are included in the halftone-dot image outputted by the image outputting apparatus, based on the halftone-dot image data, is equal to or greater than a predetermined number of screen lines.

(10) The system of item 9, wherein the predetermined number of screen lines is 140 lpi.

(11) A method for outputting an image formed on a recording medium, based on image data transmitted through a network, the method comprising: receiving the image data transmitted through the network; extracting an edge, defined as a contour of an intermediate tone object, based on depicting information represented by the image data; correcting a density value, residing within the intermediate tone object and located in a vicinity of the edge, so as to make the density value high and to generate corrected image data; converting the corrected image data to halftone-dot image data, which represent a halftone-dot image constituted by halftone-dots, each of which is formed by a plurality of pixels based on the corrected image data; and outputting the halftone-dot image formed on the recording medium, based on the halftone-dot image data, serving as the processed-image data.

(12) The method of item 11, further comprising: storing correction values determined corresponding to density values into a correction value table; wherein the density value is corrected, based on the correction values stored in the correction value table.

(13) The method of item 12, wherein the correction values are determined such values that do not make corrected density values represent a solid area.

(14) The method of item 11, wherein a number of screen lines, which are included in the halftone-dot image outputted in the outputting , based on the halftone-dot image data, is equal to or greater than a predetermined number of screen lines.

(15) The method of item 14, wherein the predetermined number of screen lines is 140 lpi.

(16) A method for outputting an image formed on a recording medium, based on image data transmitted through a network, the method comprising: receiving the image data transmitted through the network; extracting an edge, defined as a contour of an intermediate tone object, based on depicting information represented by the image data; determining a first density value and a second density value being higher than the first density, at a first side area and a second side area, respectively, while putting the edge between the first side area and the second side area as a boundary of different tone areas; correcting a density value, residing within the second side area and located in a vicinity of the edge, so as to make the density value high, when both the first density value and the second density value indicate halftone areas or when the second density value indicates a halftone area and the first density value indicates a blank tone area, while, correcting a density value, residing within the first side area and located in a vicinity of the edge, so as to make the density value high, when the first density value indicates a halftone area and the second density value indicates a saturated tone area, in order to generate corrected image data; converting the corrected image data to halftone-dot image data, which represent a halftone-dot image constituted by halftone-dots, each of which is formed by a plurality of pixels based on the corrected image data; and outputting the halftone-dot image formed on the recording medium, based on the halftone-dot image data, serving as the processed-image data.

(17) The method of item 16, further comprising: storing correction values determined corresponding to density values into a correction value table; wherein the density value is corrected, based on the correction values stored in the correction value table.

(18) The method of item 17, wherein the correction values are determined such values that do not make corrected density values represent a solid area.

(19) The method of item 16, wherein a number of screen lines, which are included in the halftone-dot image outputted in the outputting, based on the halftone-dot image data, is equal to or greater than a predetermined number of screen lines.

(20) The method of item 19, wherein the predetermined number of screen lines is 140 lpi.

Further, to overcome the abovementioned problems, other image output systems and methods, embodied in the present invention, will be described as follow:

(21) An image outputting system, characterized in that,
the image outputting system, including an image outputting apparatus which outputs an image on a image recording medium, is provided with:
an extracting means, that receives image data, for extracting a contour of an intermediate tone object, as an edge, based on depicting information represented by the image data;
a correcting means for correcting the extracted density value in the vicinity of the edge, among density values in the intermediate tone object, so as to make the density value high;
a halftone-dot generating means for converting the corrected image data to halftone-dot image data, which structure an image based on the corrected image data by using halftone-dots formed by a plurality of pixels; and
an image output controlling means for controlling the image outputting apparatus so as to output the halftone-dot image on the image recording medium based on the halftone-dot image data.

(22) An image outputting system, characterized in that,
the image outputting system, including an image outputting apparatus which outputs an image on a image recording medium, is provided with:
an extracting means, that receives image data, for extracting a contour of an intermediate tone object, as an edge, based on depicting information represented by the image data;
a correcting means for confirming density values at both sides of the edge, and for correcting a density value in the vicinity of the extracted edge among higher density values derived by comparing the density values at the both sides, when the density values at both sides of the edge indicate halftones, so as to make the density value high, while, for correcting a density value in the vicinity of the extracted edge among density values indicating a halftone, when the density value at one side of the edge indicate the halftone, so as to make the density value high;
a halftone-dot generating means for converting the corrected image data to halftone-dot image data, which structure an image based on the corrected image data by using halftone-dots formed by a plurality of pixels; and
an image output controlling means for controlling the image outputting apparatus so as to output the halftone-dot image on the image recording medium based on the halftone-dot image data.

(23) The image outputting system, recited in item 21 or item 22, characterized in that,
the image outputting system is further provided with a correction value table to store correction values determined corresponding to density values, and
based on the extracted density values in the vicinity of the edge and referring to the correction value table, the correcting means corrects the density value, based on the correction values stored.

(24) The image outputting system, recited in any one of items 21-23, characterized in that,
the correction values are determined, so that the density values after correction do not become density values indicating solid.

(25) The image outputting system, recited in any one of items 21-24, characterized in that,
the halftone-dot image data acquired by conversion operation of the halftone-dot generating means, in the image outputting apparatus, the halftone-dot image, outputted on the basis of the halftone-dot image data, is equal to or greater than a predetermined number of screen lines.

(26) The image outputting system, recited in item 25, characterized in that,
the predetermined number of screen lines is 140 lpi.

(27) An image outputting method, characterized in that
the image outputting method for outputting an image onto an image recording medium in an image outputting apparatus includes:
receipting image data;
extracting a contour of an intermediate tone object as an edge, based on depicting information represented by the image data;
correcting the extracted density value in the vicinity of the edge, among density values in the intermediate tone object, so as to make the density value high;
converting the corrected image data to halftone-dot image data, which structure an image based on the corrected image data by using halftone-dots formed by a plurality of pixels; and controlling the image outputting apparatus so as to output the halftone-dot image on the image recording medium based on the halftone-dot image data.

(28) An image outputting method, characterized in that the image outputting method for outputting an image onto an image recording medium in an image outputting apparatus includes:

receipting image data;

extracting a contour of an intermediate tone object as an edge, based on depicting information represented by the image data;

confirming density values at both sides of the edge correcting a density value in the vicinity of the extracted edge among higher density values derived by comparing the density values at the both sides, when the density values at both sides of the edge indicate halftones, so as to make the density value high, while, correcting a density value in the vicinity of the extracted edge among density values indicating a halftone, when the density value at one side of the edge indicate the halftone, so as to make the density value high;

converting the corrected image data to halftone-dot image data, which structure an image based on the corrected image data by using halftone-dots formed by a plurality of pixels; and controlling the image outputting apparatus so as to output the halftone-dot image on the image recording medium based on the halftone-dot image data.

(29) A program for making a computer conduct the image outputting method recited in item 27 or item 28.

(30) An information recording medium in which the program recited in item 29 is recorded in a computer readable manner.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

Other objects and advantages of the present invention will become apparent upon reading the following detailed description and upon reference to the drawings in which.

DETAILED DESCRIPTION OF THE PREFERRED EMBODIMENTS

Referring to the drawings, an image outputting system, embodied in the present invention, will be detailed in the following.

(System Configuration)

Figure 1:
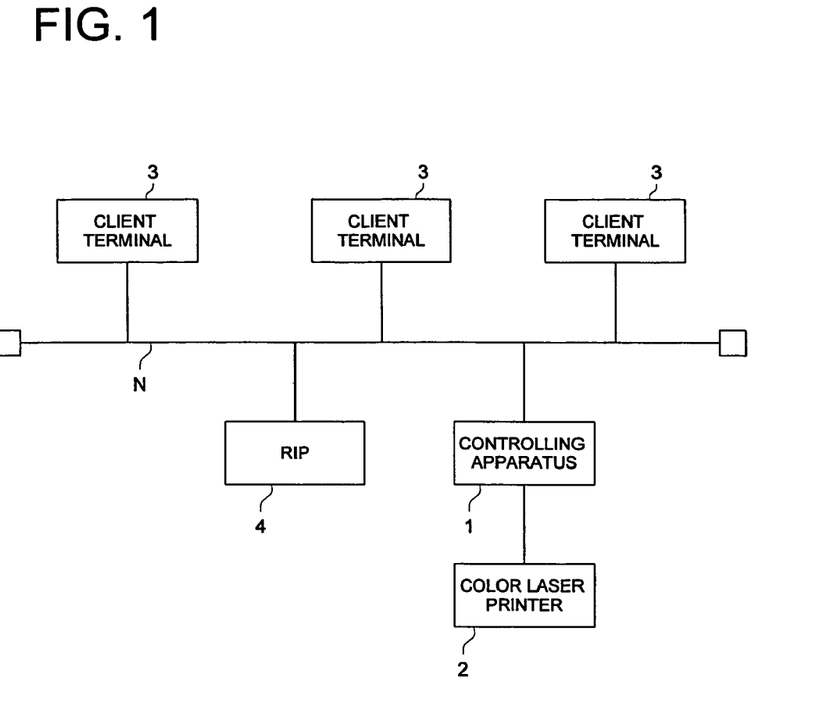
FIG. 1 is a block diagram showing the system configuration of an embodiment of the image outputting system of this invention.

Firstly the overall configuration of the image outputting system of this embodiment is described with reference to FIG. 1. FIG. 1 is a figure showing the overall configuration of the image outputting system.

As shown in FIG. 1, the image outputting system includes a control section 1 that generates halftone dots from image data that is sent from the client terminal 3 or the RIP (Raster Image Processor) 4 into halftone, and sends the image data which has been converted to halftone along with the output command signals to the color laser printer 2 which is the image outputting apparatus and the color laser printer 2 which outputs halftone dot images based on the output command signals and the image data which has been converted to halftone from the controlling apparatus 1, and both are connected to each other via the network N.

The client terminal 3 is a PC (personal computer) and in addition to the computer main body, the keyboard, the monitor and the like, the client terminal 3 also includes an image input device such as an image scanner and the like (not shown). Application software is included in the computer main body and image data is created by executing applications software and the image data is sent to the RIP 4 of the controlling apparatus 1 via the network N. In addition, a plurality of this type of client terminals is usually provided. (FIG. 1 shows 3 client terminals, but the system may be configured with only 1 client terminal or with any desired amount of client terminals.)

Figure 2:
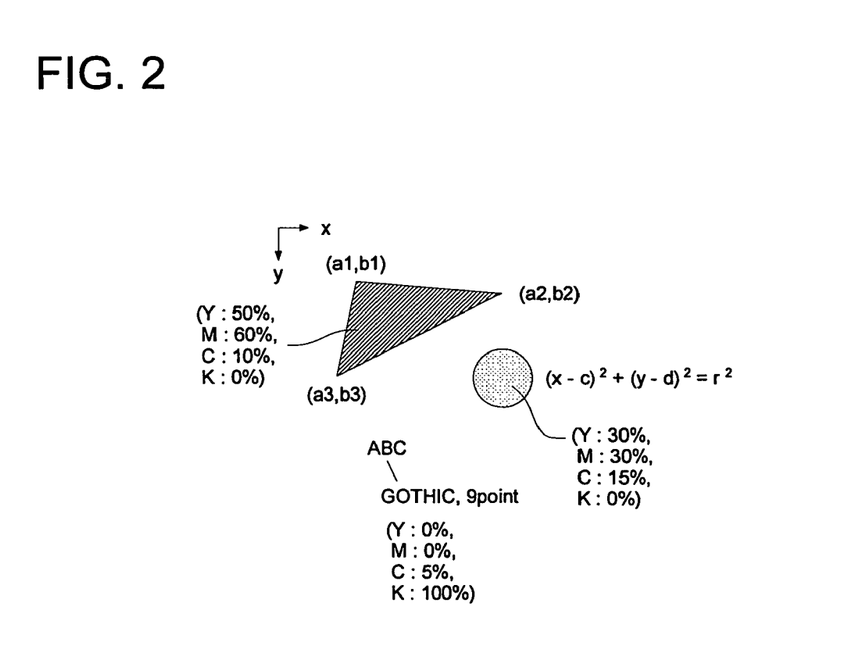
FIG. 2 is an explanatory diagram for describing vector data.

Furthermore, the types of image data that are created and sent at the client terminal 3 include vector data, which shows parameters called vector graphics for the objects displayed as images shown in FIG. 2 as point coordinates and lines or planes joining these points; font information which shows highlight colors (in FIG. 2, indicated by the density value of each of colors, Y (Yellow), M (Magenta), C (Cyan), K (Black)), special effects and text format as well as depicting information for size and the like of the fonts. Another type of image data is raster data, which is called bit map graphics, and in which, for instance, as shown in FIG. 3, the plurality of pixels that are arranged in the horizontal direction at a prescribed interval (resolution) form one line, and further, lines are arranged in vertical direction at predetermined intervals, and each pixel is indicated by depicting information indicated by the density value.

Figure 3:
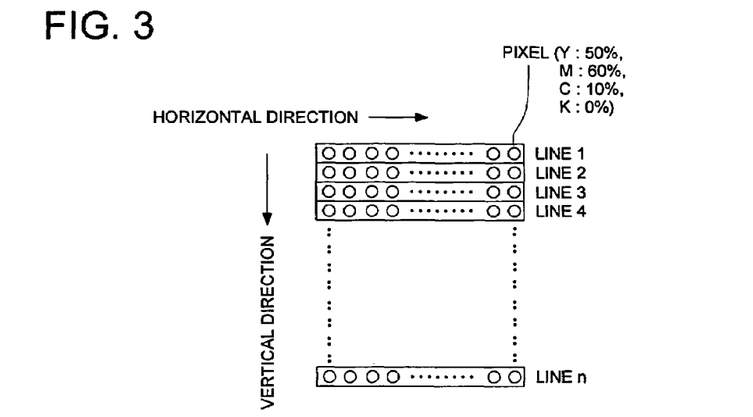
FIG. 3 is an explanatory diagram for describing raster data.

Further, the density value includes a halftone %, which stepwisely indicate halftone scales between 0% for white and 100% for solid color, both employed in FIG. 2 and FIG. 3, or a gradation value, which indicate halftone scales, for instance, between 0 for white and 255 for solid color, with stepwise values.

The RIP 4 includes a server or the like, and functions as a processor for receiving vector data sent from the client terminal 3 via the network N, and for analyzing information such as image and text font and the like and performing conversion to raster data.

As shown in FIG. 2, the controlling apparatus 1 includes a computer main body 100, a display section 105 such as a monitor or the like, an input section 106 such as a keyboard or the like, and the computer main body 100 includes the computation processing section 101 which is formed of a microprocessor, a first storage section 102 which is formed of memory, a second storage section 103 which is formed of a hard disk, an interface 104 which is for external communication, and an internal bus 107 makes it possible for the sections to communicate with each other. Furthermore, the second storage section 103 has incorporated therein, prescribed programs for image output processing, and the computation processing section 101 executes the programs and performs the image processing described hereinafter. In addition, the input section 106 includes a portable device (not shown) for reading information from the information recording medium, such as a floppy (registered trademark) disk, a CD-ROM, magnetic recording tape and the like.

Figure 4:
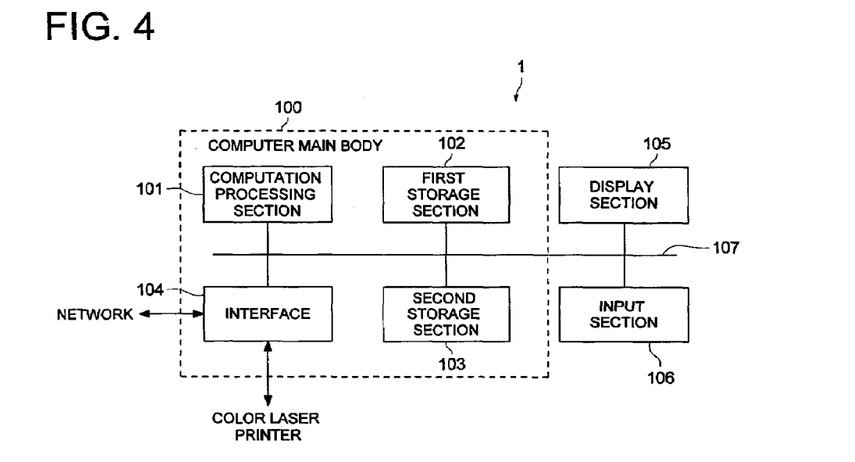
FIG. 4 is a block diagram, which shows a configuration of a controlling apparatus of the image-outputting system shown in FIG. 1.
Figure 5:
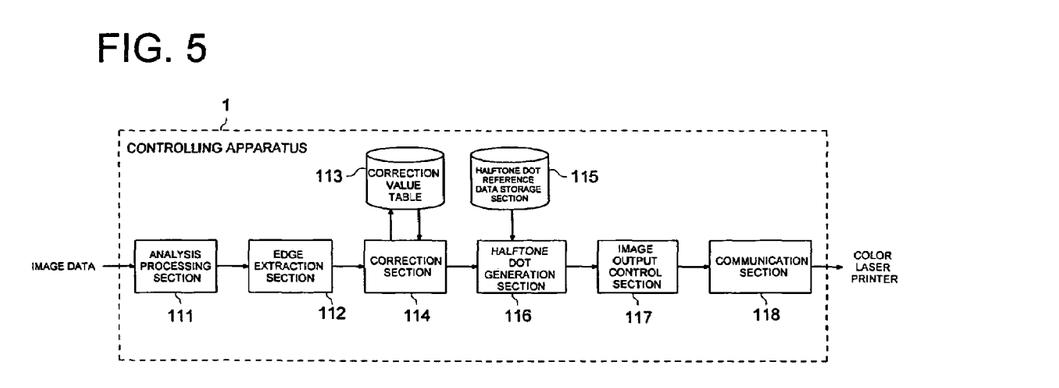
FIG. 5 is a functional block diagram showing a control configuration of a controlling apparatus in the image outputting system shown in FIG. 1.

The control configuration of the controlling apparatus 1 will be described using the functional block diagram of the controlling apparatus 1 shown in FIG. 5. The controlling apparatus 1 includes the function for each of the sections shown in FIG. 5 using the configuration shown in FIG. 4.

The analysis processing section 111 receives the image data sent from the client terminal 3 or the RIP 4, analyses the image data, and in the case where the image data is vector data, information such as image and text font and the like are analyzed and raster data is generated.

The edge extracting section 112 (extracting section) has the function of extracting the edge of intermediate tone object for which one of the colors is the intermediate tone. For example, the intermediate tone object is determined from the density values for the depicting information of the object shown by the vector table, and the outline of the intermediate tone object is extracted as the edge. In addition, in the case of the raster data, the outline of the intermediate tone object which is indicated for each color by the transition point from the intermediate tone area to the high density area whose density value is higher than that of the intermediate tone area, the lower low density region, the background portion (halftone % is 0%) or the solid portion (halftone % is 100%), is extracted as the edge.

The correcting section 114 performs correction of the density value of the intermediate tone pixels in the extracted edge vicinity by referring to the correction value table 113 in which the correction values are stored beforehand, for image data that has been converted to raster data (described in detail hereinafter).

The halftone-dot generating section 116 generates halftone-dots (the generated halftone-dot image data is called halftone-dot image data hereinafter) from the corrected raster data based on the halftone-dot reference data in the halftone-dot reference data storage section 115. The image output control section 117 sends halftone-dot image data along with output command signals to the color laser printer 2 via the communication section 118. The halftone-dot generation that occurs herein refers to converting the raster data to halftone-dot image data in which the halftone-dots are formed of a plurality pixels and which includes halftone-dot images, which indicate tint by the size of the halftone-dots. Accordingly, the halftone-dot image data is formed of an image from halftone-dot images based on the corrected raster data using the halftone dots.

Figure 6:
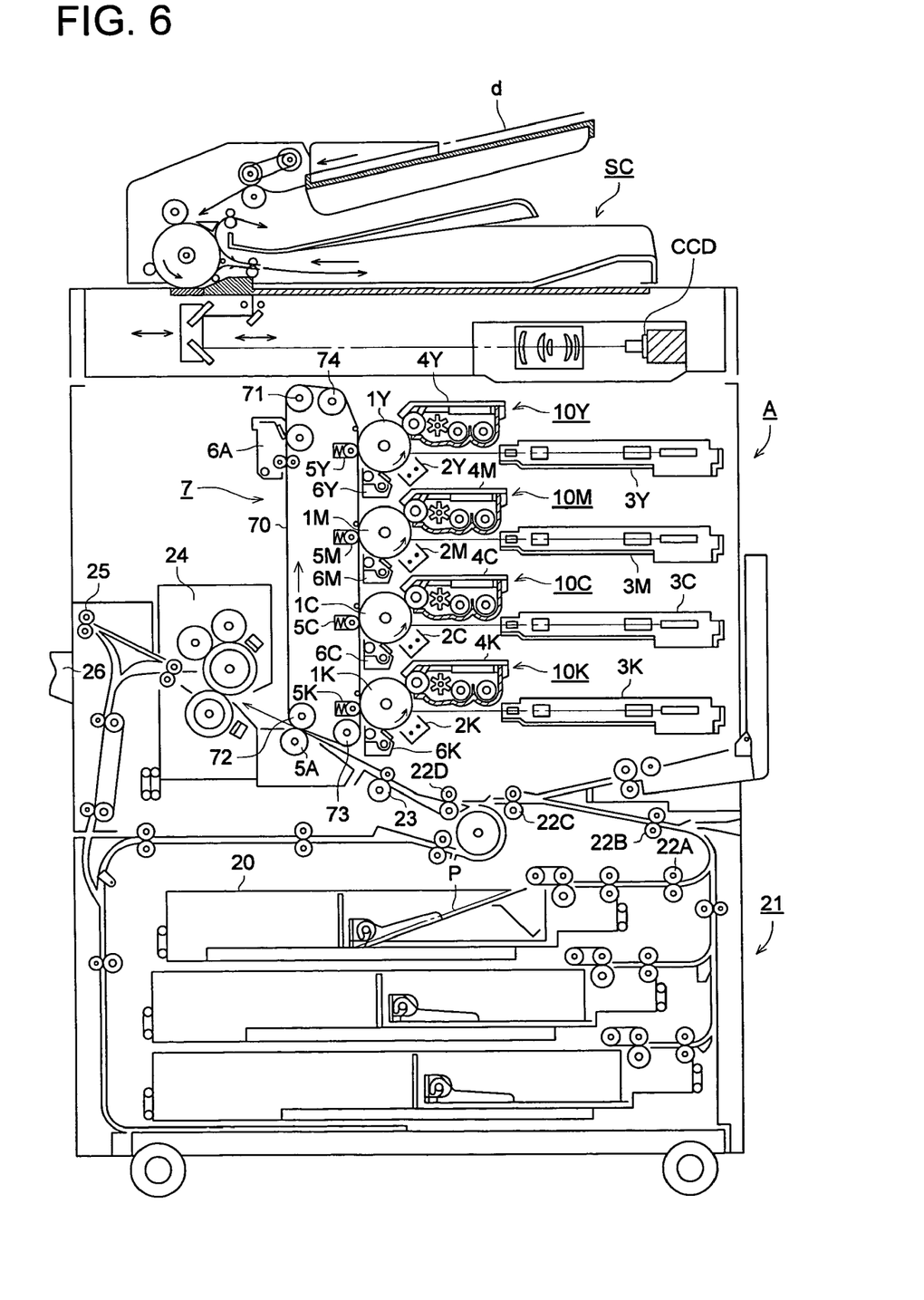
FIG. 6 is cross-sectional diagram showing a schematic device configuration for a color laser printer, which is the image outputting system shown in FIG. 1.

The color laser printer 2 is such an image forming apparatus that employs an electro-photographic method for forming an image and is generally called as a tandem-type color copier. As shown in FIG. 6, the color laser printer 2 is provided with an image-reading section SC for reading an image residing on a document when copying the document, image forming sections 10Y, 10M, 10C, 10K, and exposing sections 3Y, 3M, 3C, 3K for respectively forming each of unicolor images of Yellow, Magenta, Cyan and Black, an intermediate transfer unit 7, a paper feeding section 21 and a fixing unit. Although, in the example embodied in the present invention, the tandem-type color copier is employed as the color laser printer 2, it is applicable that the color laser printer 2 is, for instance, a tandem-type color printer, since the copy function is not necessary for implementing the present invention.

The image forming sections 10Y, 10M, 10C, 10K are disposed in a vertical direction as a tandem alignment, while the intermediate transfer member 70, which is shaped in a semiconductor endless belt and rotatably threaded on rollers 71, 72, 73, 74, is disposed at the left side of photoreceptor drums 1Y, 1M, 1C, 1K as shown in the drawing.

Further, the intermediate transfer member 70 is driven by an intermediate-transfer member driving roller 71 coupled to the driving device (not shown in the drawings), so as to rotate in a direction indicated by the arrow in the drawing.

The image forming section 10Y for forming the unicolor image of color Y (Yellow) includes a charging device 2Y, an exposing section 3Y, a developing device 4Y, a first transfer roller 5Y and a cleaning device 6Y, which are arranged around the photoreceptor drum 1Y.

The image forming section 10M for forming the unicolor image of color M (Magenta) includes a charging device 2M, an exposing section 3M, a developing device 4M, a first transfer roller 5M and a cleaning device 6M, which are arranged around the photoreceptor drum 1M.

The image forming section 10C for forming the unicolor image of color C (Cyan) includes a charging device 2C, an exposing section 3C, a developing device 4C, a first transfer roller 5C and a cleaning device 6C, which are arranged around the photoreceptor drum 1C.

The image forming section 10K for forming the unicolor image of color K (Black) includes a charging device 2K, an exposing section 3K, a developing device 4K, a first transfer roller 5K and a cleaning device 6K, which are arranged around the photoreceptor drum 1K.

Figure 7:
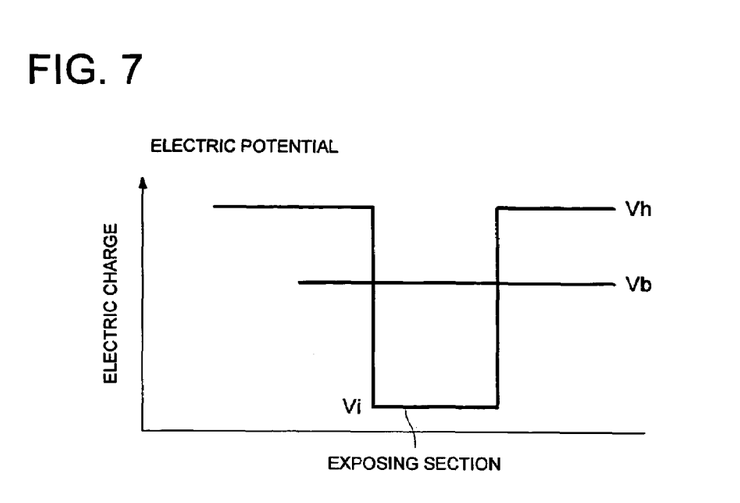
FIG. 7 is a diagram for explaining an electric potential state on a surface of a photoreceptor of the color laser printer.

When the halftone-dot image data are transmitted to the color laser printer 2 from the control apparatus 1, the charging devices 2Y, 2M, 2C, 2K uniformly charge the surface of the photoreceptor drums 1Y, 1M, 1C, 1K to a predetermined polarity and a predetermined electrostatic potential, while rotating the photoreceptor drums 1Y, 1M, 1C, 1K in the directions indicated by the arrows in the drawing. Then, in each of the exposing sections 3Y, 3M, 3C, 3K, a laser diode (not shown in the drawings) is modulated to emit a modulated laser beam based on unicolor halftone-dot image data of the corresponding color, in order to scan the modulated laser beam onto corresponding one of the photoreceptor drums 1Y, 1M, 1C, 1K in a direction orthogonal to the rotating direction of each of the photoreceptor drums 1Y, 1M, 1C, 1K, so that an electrostatic latent image is formed on each of the photoreceptor drums 1Y, 1M, 1C, 1K by the rotating operation for each photoreceptor drum and the repetitions of the scanning operation for the modulated laser beam. Hereinafter, the scanning direction of the modulated laser beam is defined as a main-scanning direction, the rotating direction of each photoreceptor drum is defined as a sub-scanning direction, and the rotation of each photoreceptor drum is defined as a movement of photoreceptor drum in a sub-scanning direction. For instance, as shown in FIG. 7, when the unicolor image is exposed onto the corresponding surface of the photoreceptor drums 1Y, 1M, 1C, 1K by scanning the modulated laser beam after the charging devices 2Y, 2M, 2C, 2K respectively charge the photoreceptor drums 1Y, 1M, 1C, 1K at electrostatic potential Vh of the negative polarity, the electrostatic potential of the exposed area is drastically reduced to electrostatic potential Vi so as to form the electrostatic latent image. Successively, respective unicolor toner images are formed by the developing devices 4Y, 4M, 4C, 4K.

Further, the first transfer rollers 5Y, 5M, 5C, 5K are controlled to be selectively activated, so as to press-push the intermediate transfer member 70 against the photoreceptor drums 1Y, 1M, 1C, 1K, respectively.

According to the abovementioned process, the unicolor toner images, formed on the photoreceptor drums 1Y, 1M, 1C, 1K by means of the image forming sections 10Y, 10M, 10C, 10K, are sequentially transferred onto the intermediate transfer member 70, so as to form a full color toner image synthesized from the unicolor toner images.

A paper P, serving as an image-recording medium and accommodated in a paper feeding cassette 20, is fed by a paper feeding unit 21 and is conveyed to a second transfer roller 5A through a plurality of intermediate rollers 22A, 22B, 22C, 22D and a registration roller 23, so that the full color toner image, residing on the intermediate transfer member 70, is transferred onto the paper P at a time by means of the second transfer roller 5A.

Incidentally, the second transfer roller 5A press-contacts the roller 72 while putting the intermediate transfer member 70 and the paper P between them, only when the paper P passes through this point to achieve the second transferring operation.

On the other hand, after the second transferring operation, for transferring the full color toner image onto the paper P by means of the second transfer roller 5A, is completed, the paper P is separated from the intermediate transfer member 70 due to the curvature separating action, and then, residual toner are removed from the intermediate transfer member 70 by means of a cleaning unit 6A.

The paper P, onto which the full color toner image is already transferred, is conveyed into a fixing device 24 to fix the full color toner image onto the paper P, and then, is nipped by an ejecting roller 25 so as to eject the paper P onto an ejecting tray disposed outside the apparatus.

According to the configuration mentioned in the above, the controlling apparatus can convert the image data to the halftone dot image data, and the color laser printer 2 can create the color proof or the final product, based on the halftone dot image data.

(Image Output Method)

Figure 8:
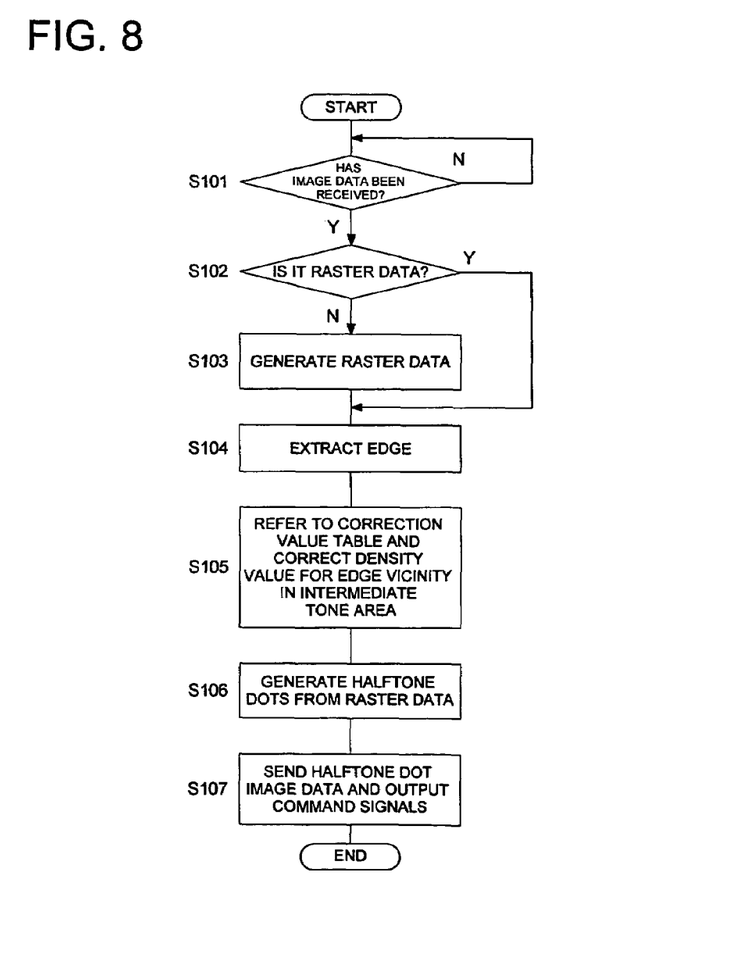
FIG. 8 is a flowchart showing the image forming method of this embodiment.

Next the method for outputting images, which are performed in the image outputting system, will be described using the flowchart in FIG. 8. FIG. 8 is a flowchart showing the processing of the controlling apparatus 1.

When the controlling apparatus 1 receives the image data (Y in Step S101; Note that Step S101 will be abbreviated to S101 hereinafter and this is the case for the other steps as well), if the image data has been made into raster data at the RIP4 (Y in S102), S104 is the next step, and in the case where it is vector data (N in S102) raster data is generated by the analysis processing section 111 (S103) and then the process proceeds to S104. In S104, the edge extracting section 112 extracts the edge of the halftone object in such a manner that is indicated in the explanation of the edge extracting section 112 mentioned in the above.

In S105, the correcting section 114 performs correction of the density values of the pixels located in the extracted edge vicinity for each color based on correction values stored in advance, by referring to the correction value table 113 (described in detail hereinafter). The correction values that are stored in the correction value table 113 herein, are values determined in advance by performing experiments.

Figure 9A:
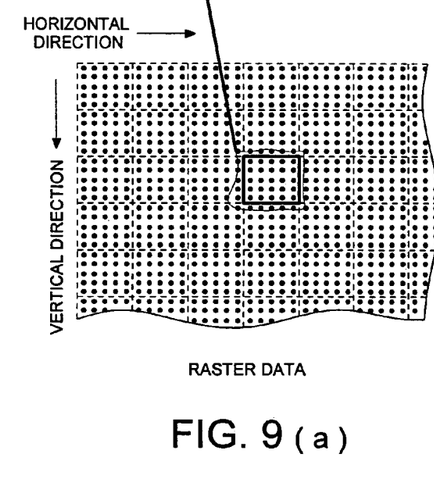
FIG. 9(a), FIG. 9(b), FIG. 9(c), FIG. 9(d) and FIG. 9(e) are explanatory diagrams for explaining a conversion of the raster data into halftone-dot image data, which is achieved by using halftone-dot reference data.
Figures 9B, 9C, 9D:
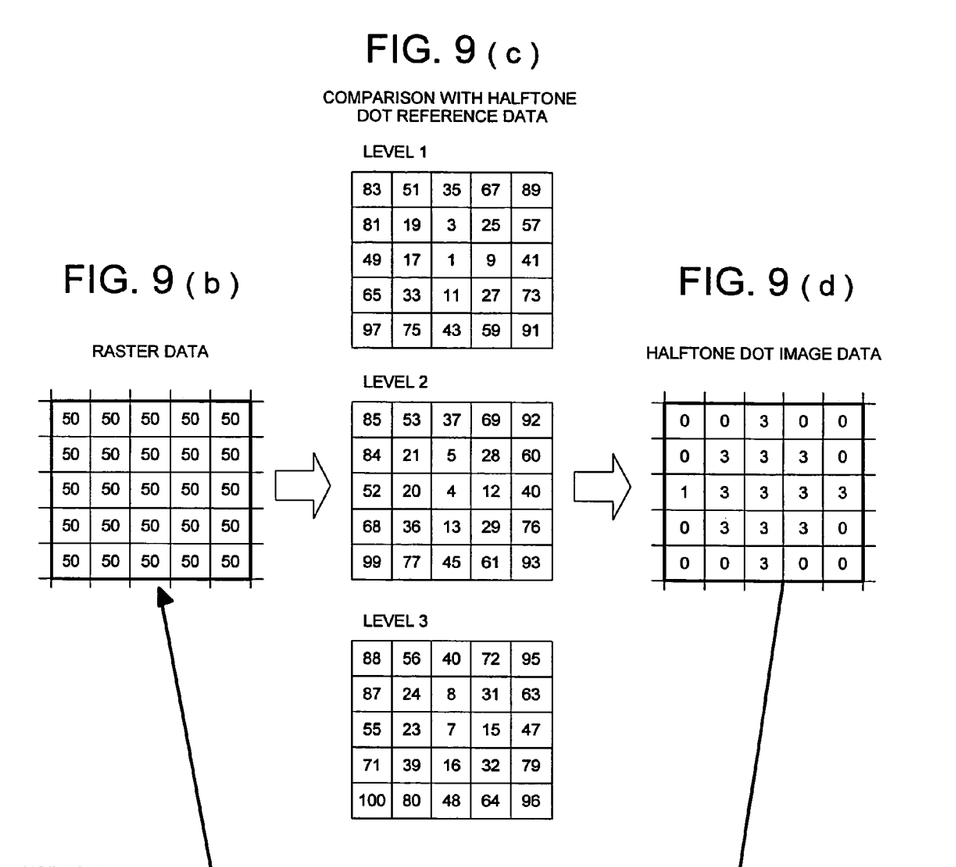
Figure 9E:
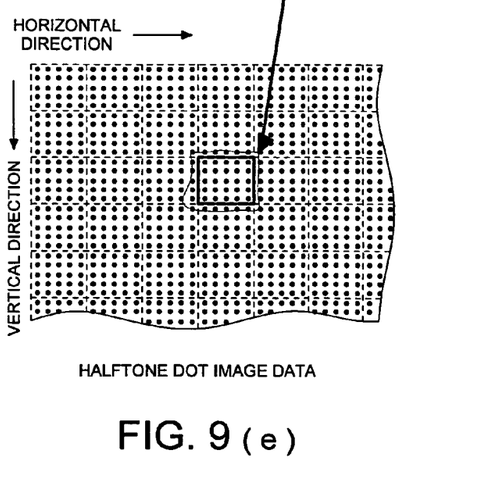

In S106, the corrected raster data for each of the colors is converted to halftone-dot image data based on the halftone-dot reference data in the halftone-dot reference data storage section 115. One example of halftone-dot generation will be described in which the raster data is divided into 5 pixel×5 pixel areas as shown in FIG. 9 (a), and one halftone-dot is formed of the pixels of each region. However in this example, the color laser printer 2 is one in which each pixel is formed of 4 gradations. The four gradations which the color laser printer 2 forms are color densities and are indicated by "0" for white and "3" for solid color and the densities between "0" and "3" are assigned values of "1" and "2" starting with the lower value. Three levels of halftone-dot reference data which are level 1, level 2, and level 3 formed of threshold values arranged in accordance with prescribed rules are stored in the halftone-dot reference data storage section 115 as shown in FIG. 9 (c) so that the size of the halftone-dot within the region and the gradation value of the pixels can be changed in accordance with whether the density value of the raster data is large or small. FIG. 9(b) shows the density value for each pixel of the 5 pixel×5 pixel areas which form the raster data shown in FIG. 9 (a) as halftone %. However, the halftone % of each pixel is compared to the threshold value for the position corresponding to the halftone-dot reference data, and if the halftone % for the level 1 halftone reference data is the same or larger than the threshold value, "1" is selected, while if it is less than the threshold value, "0" is selected. If the halftone % for the level 2 halftone reference data is the same or larger than the threshold value, "2" is selected, while if it is less than the threshold value, "0" is selected. If the halftone % for the level 3 halftone reference data is the same or larger than the threshold value, "3" is selected, while if it is less than the threshold value, "0" is selected. The gradation value of the pixel in the color laser printer 2 is determined by selecting the maximum value from among the selected values. In this manner, the raster data shown in FIG. 9 (b) is converted as shown in FIG. 9 (b). FIG. 9 (d) corresponds to the position in the raster data shown in FIG. 9 (a) for the area shown in FIG. 9 (b) of the halftone-dot image data shown in FIG. 9 (e). In the example described here, halftone-dots are formed by the pixels indicated by 4 gradations, but halftone-dots may be generated using halftone-dot reference data formed of threshold value groups arranged according to prescribed rules such that the halftone-dot may be formed of pixels that are indicated by binary values. In addition, in this example the halftone-dot is formed using a pixel within a 5 pixel×5 pixel area, but the halftone-dot is not limited to this formation. Also, halftone-dot images having different numbers of screen lines lpi (line per inch) can be formed by changing the area (number of pixels) forming the halftone-dot. In this case, the conversion can be performed by using halftone reference data corresponding to the area.

In addition, in S107, the image output control section 117 sends the halftone image data for each color as well as output command signals to the color laser printer 2 via the communication section 118.

The color laser printer 2 forms color images based on the gradation value shown in each of the pixels of the halftone image data for each color, and the color image is output as a color proof or a final product.

Figure 10:
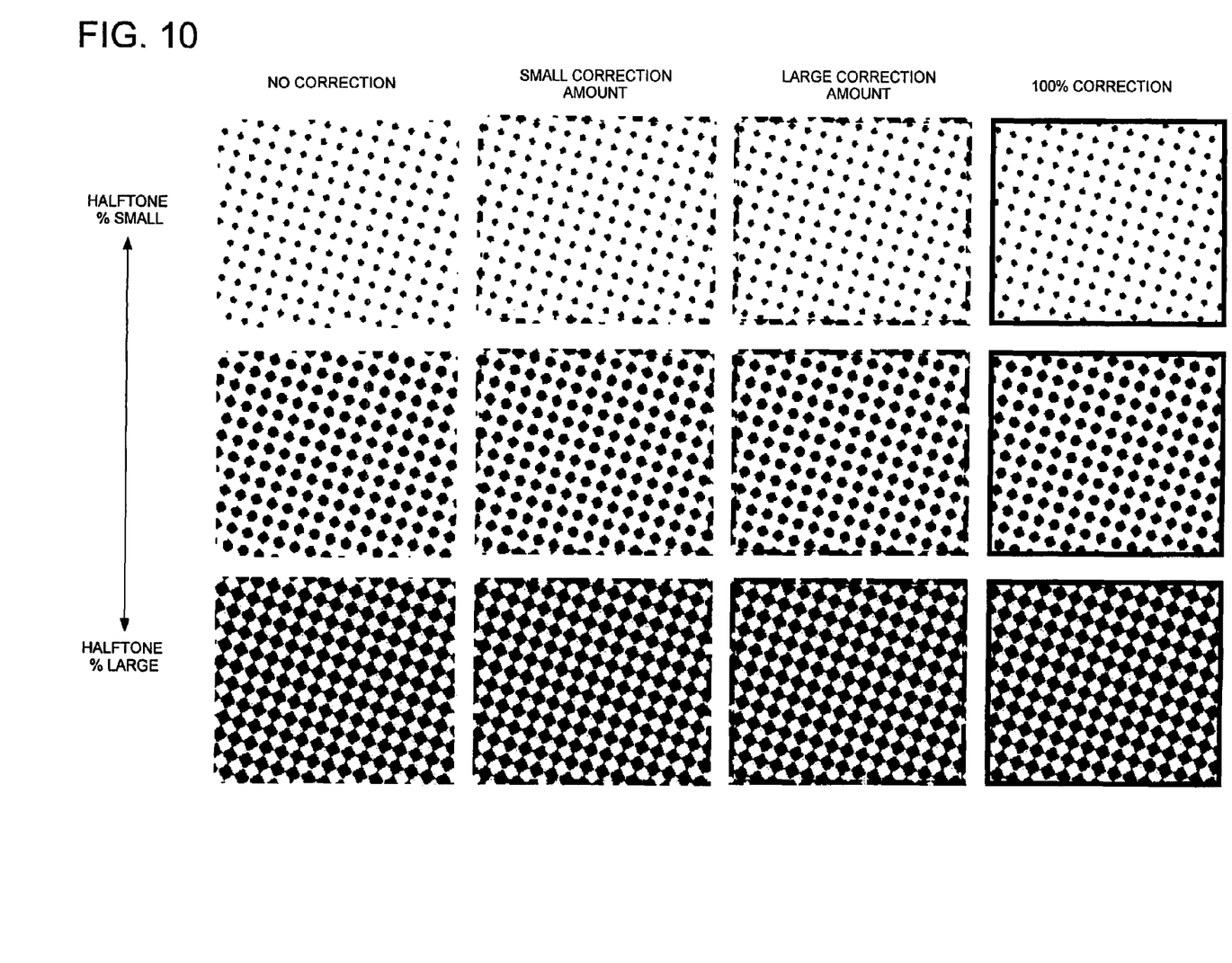
FIG. 10 is a pattern diagram of a halftone-dot image for describing the state of the object outline due to correction of the density value according to this invention.

The halftone-dots of the edge vicinity of objects are formed larger and with greater density in the print that is output in this manner due to the density values of the extracted edge vicinity pixel being corrected for each color of the intermediate tone objects, and thus the outline is smooth and image quality is improved. FIG. 10 is used to give a more detailed description in the following.

FIG. 10 is a pattern diagram showing for the images with 3 halftone % levels, the case where there is no correction, and as examples the cases where there is correction such that correction values for 2 levels (small correction value and large correction value) are added to the original halftone % value and the halftone % is increased (density value is increased), as well as the case where the halftone % is corrected to 100%. According to FIG. 10, at the edge portion of the object that has not been corrected, parts of the halftone-dot are missing and thus smoothness of the outline is lost and the outline which is supposed to be linear appears like a saw tooth. However, by performing correction of the halftone % of the pixels of the edge vicinity, it becomes clear that the halftone-dot of the edge vicinity of the objects become larger and the density is increased and thus the outline becomes smooth. Furthermore, in FIG. 10, the halftone-dot image is enlarged and shown as a pattern diagram, and because the edge vicinity of the object including the halftone with a portion missing has a lower density than the middle portion of the object including the complete halftone-dot on the paper P on which a halftone-dot image is actually formed, the saw tooth shape of the outline appears more exaggerated in the object that has not been corrected than shown in FIG. 10, and in the object for which correction has been performed, the outline can be smooth and no incongruity in density occurs.

In addition, if the edge vicinity is corrected to a halftone % of 100%, as shown in FIG. 10, the outline of the object is enclosed by lines, but it is preferable that in the case where this poses a problem in terms of checking by the color proof, correction is done in an amount that does not form lines.

Figure 11:
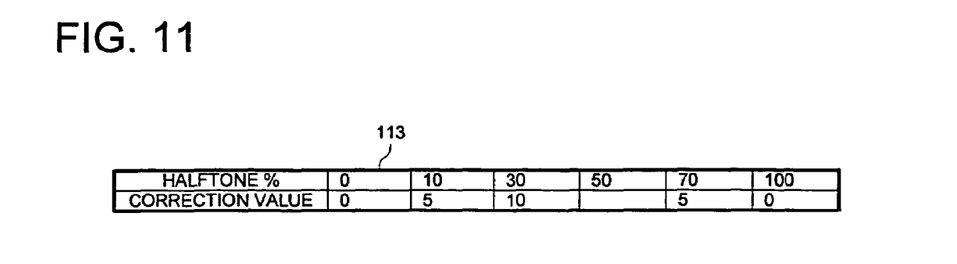
FIG. 11 shows an example of a structure of the correction value table shown in FIG. 5.

Because the impression of the edge is different depending on the halftone % of the object as shown in FIG. 10, it is preferable that the correction value is changed in accordance with the halftone % of the object. For example, as shown in FIG. 11, the density values and the correction values corresponding to the density values are stored in the correction value table 113. It is sufficient for the correcting section 114 to refer to the correction value table 113, and determine the correction value from the density value of the object and then perform correction. (The correction values for the halftone % not shown in the correction value table can be determined by interpolation.)

The correction values stored in the correction value table 113 such as that that shown in FIG. 11 may be values determined by performing experiments in advance such as those in which the correction values are changed as described above and the object is output. In addition, according to the correction value table shown in FIG. 11, if the halftone % is about 20% to 60%, the correction value will be larger, but this is because the saw tooth appearance of the outline is emphasized at a halftone % of about 20% to 60%, and the correction value is made large and the outline is smoothened. In addition, the density value after the correction is set such that the halftone % is not 100%.

Figure 12:
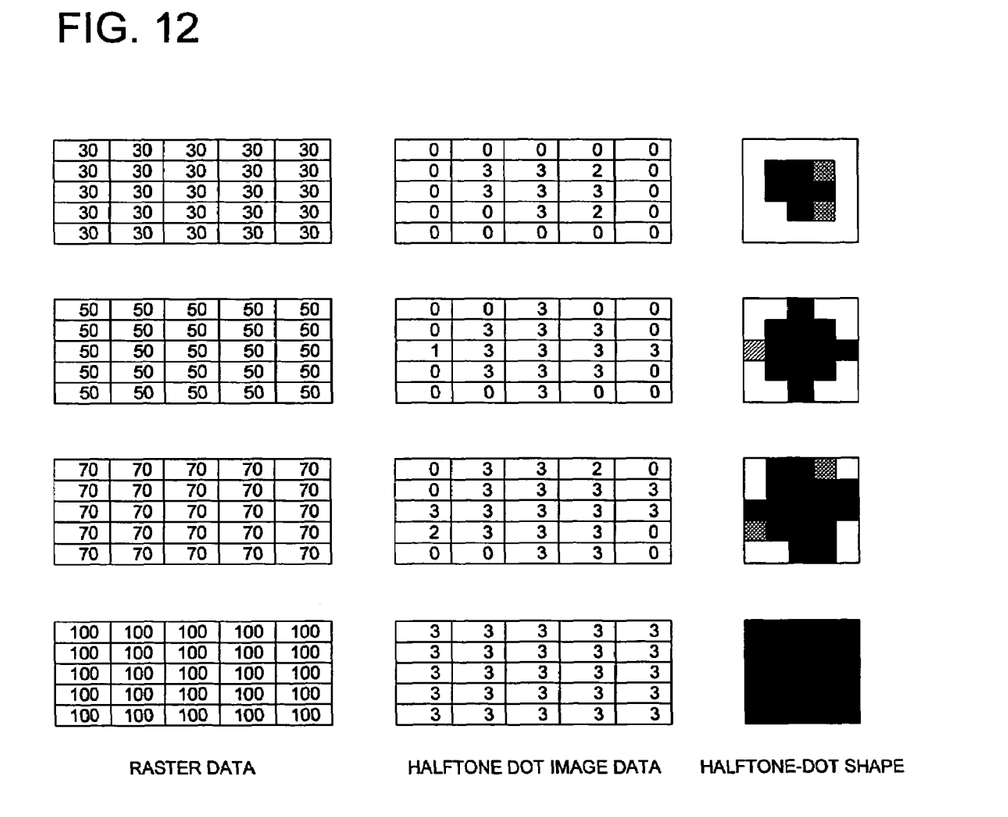
FIG. 12 shows the raster data, the halftone-dot image data, and the halftone-dots corresponding to the halftone-dot image data.

The formation of larger and denser halftone-dots due to correction is described using the example in which the halftone-dot is formed in a 5 pixel×5 pixel area with the pixels having 4 gradations. FIG. 12 shows the halftone-dot image data that has been converted from raster data in the case where the halftone % is 30%, 50%, 70% and 100%, using the halftone reference data shown in FIG. 9 (c) as well as the halftone-dots corresponding to the halftone-dot image data. As shown in FIG. 12, it is clear that as the halftone % gets larger, the halftone-dot becomes larger and the density becomes greater. That is to say, by performing correction such that the density value at the edge vicinity of the object is increased, the halftone-dots are formed larger and with greater density.

Figure 13:
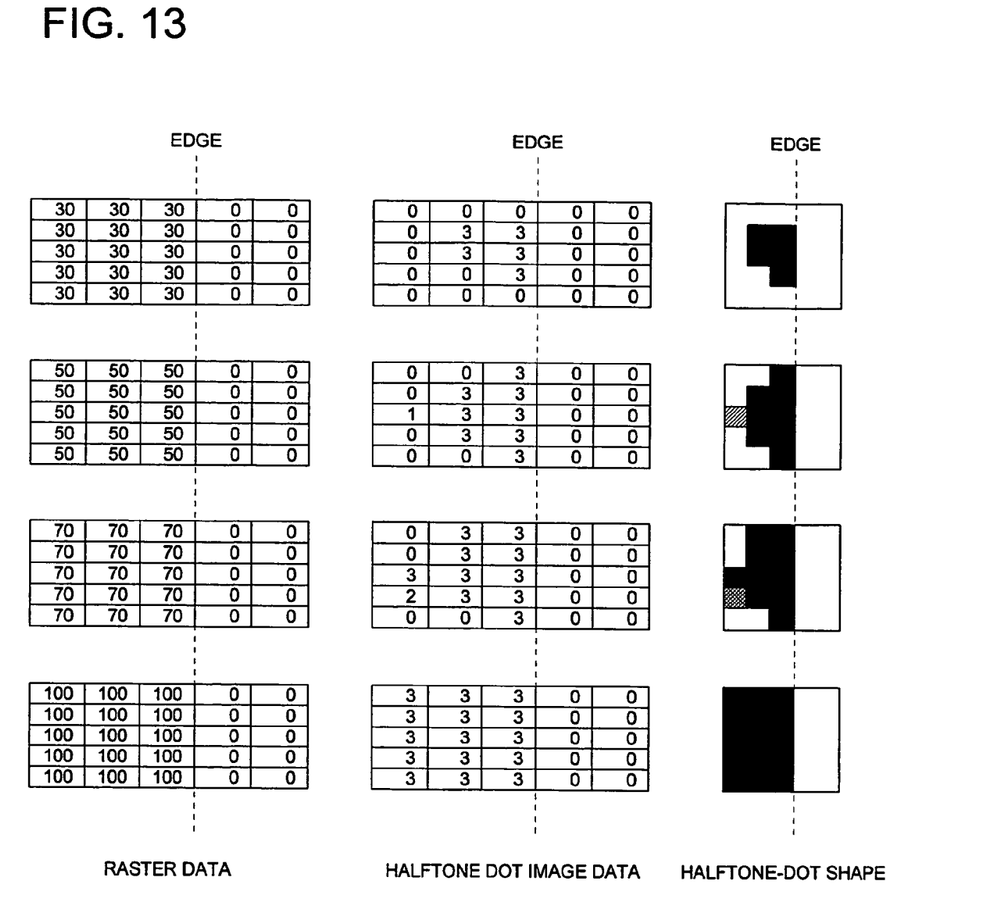
FIG. 13 shows the raster data, the halftone-dot image data, and the halftone-dots corresponding to the halftone-dot image data.

FIG. 13 shows the halftone-dot image data that has been converted from raster data using the halftone reference data shown in FIG. 9 (c) in the case where the halftone % is 30%, 50%, 70% and 100% and the edge is present within the area forming the halftone-dot and a portion of the halftone-dot is missing, as well as the halftone-dots corresponding to the halftone-dot image data. As shown in FIG. 13, it is clear that the halftone-dot having a missing portion gets larger and the density is greater in the edge vicinity area within the object as the halftone % increases. That is to say, by performing correction such that the halftone % at the edge vicinity of the object is high, the halftone-dots with a portion missing are formed large and with greater density.

The correction is preferably within the range of a minimum of 10 μm (equivalent to 1 dot at 2400 dpi) from the edge and a maximum of 250 μm from the edge. This is because if the correction range is less than 10 μm, the effect of smoothing the outline is almost non-existent, while if it exceeds 25 μm, the corrected range is sometimes mistaken for the linear area.

In addition, if the number of screen lines (lpi) of the halftone-dot image is large, or in other words, the area for forming the halftone-dots is made small and the number of pixels are reduced, the halftone-dots resulting from the process characteristics become even more unstable in the electro-photographic color laser printer of this invention. However, by performing the correction described above, the outline of the intermediate tone object that is output can be made smooth. In other words, the effect at electro-photographic color laser printer is favorable when the number of screen lines is high, and the effect is particularly favorable when the number of screen lines is not less than 140 (lpi).

In the case where the halftone-dots are formed of pixels that are shown as binary values, by correcting the density value of the edge vicinity of the object, the halftone-dot is formed larger and the outline becomes smooth.

In the case where intermediate tone objects are adjacent to each other and the adjacent intermediate tone objects form the edge, the density values of the pixels having higher density values that are located in the intermediate tone area of the extracted edge vicinity may be corrected for each color. For example, as shown in Step 105 of the flowchart shown in FIG. 8, the density values for both sides of the extracted edge are checked and if the density values for both edges indicate intermediate tone, the density values for both edges are compared and the density values of the edge vicinity of the pixels having higher density values are corrected with reference to the correction value table 113. In the case where only one of the edges indicate intermediate tone, the density values located in the edge vicinity of those intermediate tone pixels are corrected with reference to the correction value table 113 In this manner, by correcting the higher density values in the case where the density values of both sides of the edge show intermediate tone, the edges of the intermediate tone object, or in other words the boundary appears smooth.

Program and the Information Recording Medium for Recording the Program

It is to be noted that the programs for executing the processes performed in the controlling apparatus 1 including the image outputting system, or more specifically, the processing steps of the image output method described with reference to FIG. 8, in the computer of the controlling apparatus 1 are incorporated into the computer main-body of the controlling apparatus 1, or alternatively the programs may be recorded in an information recording medium which can be connected to the computer and read by the computation processing section section 101 which is the computing section that is incorporated into the computer main body in the same manner as above, and the programs are thereby executed.

It is to be noted that specific examples of the information recording medium include semiconductor memory such as ROM, RAM, and flash memory, HDD, and memory devices such as integrated circuits, optical disks, magneto-optic disk (CD-ROM/DVD-RAM/DVD-ROM/MO and the like), and magnetic recording media such as magnetic disks (hard disk, floppy (registered trademark) disks, ZIP and the like).

It is to be noted that the image outputting system of this embodiment, the image output method, the program for executing the method and the computer-readable information recording medium on which the program is recorded illustrates a favorable embodiment of this invention but is not intended to exclude other embodiments.

According to an embodiment of the present invention, the following effects may be attained.

(1) The outline of the object becomes smooth and image quality is improved by correcting the density values in the edge vicinity for the intermediate tone object.

(2) The edge or boundary of adjacent intermediate tone objects are made to appear smooth by correcting the higher of the density values for both sides of the edge in the case where intermediate tone objects are adjacent to each other and the adjacent intermediate tone objects form an edge.

(3) The correction is performed in accordance with the density of the intermediate tone object.

(4) The outline of the intermediate tone object is not enclosed by lines and thus lines do not create a problem at the time of checking using color proofs.

(5). The outline of the object is made smooth and the image quality is improved in the case where the image outputting apparatus outputs a halftone-dot image which has more than a prescribed number of screen lines.

(6) The outline of the object is made smooth and the image quality is improved in the case where the image outputting apparatus outputs a halftone-dot image in which the number of screen lines is not more than 140 lpi.

(7) The outline of the object becomes smooth and image quality is improved by correcting the density value of edge vicinity of the intermediate tone object.

(8) The edge or boundary of the adjacent intermediate tone objects are made to appear smooth by correcting the higher of the density values for both sides of the edge in the case where intermediate tone objects are adjacent to each other and the adjacent intermediate tone objects form an edge.

(9) It becomes possible to provide a program for implementing the image output method on a computer.

(10) It becomes possible to provide an information recording medium in which the program is recorded in a computer readable format.

Disclosed embodiment can be varied by a skilled person without departing from the spirit and scope of the invention.

While the preferred embodiments of the present invention have been described using specific terms, such description is for illustrative purposes only, and it is to be understood that changes and variations may be made without departing from the spirit or scope of the appended claims.

What is claimed is:

1. A system for outputting an image formed on a recording medium, based on image data transmitted through a network, said system comprising:
an image outputting apparatus to output said image formed on said recording medium; and
a controlling apparatus that receives said image data transmitted through said network to output processed-image data generated from said image data, and controls said image outputting apparatus so as to form said image on said recording medium, based on said processed-image data;
wherein said controlling apparatus includes:
an extracting section to extract an edge, defined as a contour of an intermediate tone object, based on depicting information represented by said image data;
a correcting section to correct a density value, residing within said intermediate tone object and located in a vicinity of said edge, so as to make said density value high and to generate corrected image data; and
a halftone-dot image data generating section to convert said corrected image data to halftone-dot image data, which represent a halftone-dot image constituted by halftone-dots, each of which is formed by a plurality of pixels based on said corrected image data; and
wherein said controlling apparatus controls said image outputting apparatus so as to output said halftone-dot image formed on said recording medium, based on said halftone-dot image data, serving as said processed-image data.

2. The system of claim 1, further comprising:
a correction value table to store correction values determined corresponding to density values;
wherein said correcting section corrects said density value, based on said correction values stored in said correction value table.

3. The system of claim 2,
wherein said correction values are determined such values that do not make corrected density values represent a solid area.

4. The system of claim 1,
wherein a number of screen lines, which are included in said halftone-dot image outputted by said image outputting apparatus, based on said halftone-dot image data, is equal to or greater than a predetermined number of screen lines.

5. The system of claim 4,
wherein said predetermined number of screen lines is 140 lpi.

6. A system for outputting an image formed on a recording medium, based on image data transmitted through a network, said system comprising:
an image outputting apparatus to output said image formed on said recording medium; and
a controlling apparatus that receives said image data transmitted through said network to output processed-image data generated from said image data, and controls said image outputting apparatus so as to form said image on said recording medium, based on said processed-image data;
wherein said controlling apparatus includes:
an extracting section to extract an edge, defined as a contour of an intermediate tone object, based on depicting information represented by said image data;
an edge-side density value determining section to determine a first density value and a second density value being higher than said first density, at a first side area and a second side area, respectively, while putting said edge between said first side area and said second side area as a boundary of different tone areas;
a correcting section to correct a density value, residing within said second side area and located in a vicinity of said edge, so as to make said density value high, when both said first density value and said second density value indicate halftone areas or when said second density value indicates a halftone area and said first density value indicates a blank tone area, while, to correct a density value, residing within said first side area and located in a vicinity of said edge, so as to make said density value high, when said first density value indicates a halftone area and said second density value indicates a saturated tone area, in order to generate corrected image data; and a halftone-dot image data generating section to convert said corrected image data to halftone-dot image data, which represent a halftone-dot image constituted by halftone-dots, each of which is formed by a plurality of pixels based on said corrected image data; and wherein said controlling apparatus controls said image outputting apparatus so as to output said halftone-dot image formed on said recording medium, based on said halftone-dot image data, serving as said processed-image data.

7. The system of claim 6, further comprising:

a correction value table to store correction values determined corresponding to density values;

wherein said correcting section corrects said density value, based on said correction values stored in said correction value table.

8. The system of claim 7, wherein said correction values are determined such values that do not make corrected density values represent a solid area.

9. The system of claim 6, wherein a number of screen lines, which are included in said halftone-dot image outputted by said image outputting apparatus, based on said halftone-dot image data, is equal to or greater than a predetermined number of screen lines.

10. The system of claim 9, wherein said predetermined number of screen lines is 140 lpi.

11. A method for outputting an image formed on a recording medium, based on image data transmitted through a network, said method comprising:

receiving said image data transmitted through said network;

extracting an edge, defined as a contour of an intermediate tone object, based on depicting information represented by said image data;

correcting a density value, residing within said intermediate tone object and located in a vicinity of said edge, so as to make said density value high and to generate corrected image data;

converting said corrected image data to halftone-dot image data, which represent a halftone-dot image constituted by halftone-dots, each of which is formed by a plurality of pixels based on said corrected image data; and outputting said halftone-dot image formed on said recording medium, based on said halftone-dot image data, serving as said processed-image data.

12. The method of claim 11, further comprising:

storing correction values determined corresponding to density values into a correction value table;

wherein said density value is corrected, based on said correction values stored in said correction value table.

13. The method of claim 12, wherein said correction values are determined such values that do not make corrected density values represent a solid area.

14. The method of claim 11, wherein a number of screen lines, which are included in said halftone-dot image outputted in said outputting, based on said halftone-dot image data, is equal to or greater than a predetermined number of screen lines.

15. The method of claim 14, wherein said predetermined number of screen lines is 140 lpi.

16. A method for outputting an image formed on a recording medium, based on image data transmitted through a network, said method comprising:

receiving said image data transmitted through said network;

extracting an edge, defined as a contour of an intermediate tone object, based on depicting information represented by said image data;

determining a first density value and a second density value being higher than said first density, at a first side area and a second side area, respectively, while putting said edge between said first side area and said second side area as a boundary of different tone areas;

correcting a density value, residing within said second side area and located in a vicinity of said edge, so as to make said density value high, when both said first density value and said second density value indicate halftone areas or when said second density value indicates a halftone area and said first density value indicates a blank tone area, while, correcting a density value, residing within said first side area and located in a vicinity of said edge, so as to make said density value high, when said first density value indicates a halftone area and said second density value indicates a saturated tone area, in order to generate corrected image data;

converting said corrected image data to halftone-dot image data, which represent a halftone-dot image constituted by halftone-dots, each of which is formed by a plurality of pixels based on said corrected image data; and outputting said halftone-dot image formed on said recording medium, based on said halftone-dot image data, serving as said processed-image data.

17. The method of claim 16, further comprising:

storing correction values determined corresponding to density values into a correction value table;

wherein said density value is corrected, based on said correction values stored in said correction value table.

18. The method of claim 17, wherein said correction values are determined such values that do not make corrected density values represent a solid area.

19. The method of claim 16, wherein a number of screen lines, which are included in said halftone-dot image outputted in said outputting, based on said halftone-dot image data, is equal to or greater than a predetermined number of screen lines.

20. The method of claim 19, wherein said predetermined number of screen lines in 140 lpi.

* * * * *